United States Patent [19]
Helot et al.

[11] Patent Number: 6,160,378
[45] Date of Patent: Dec. 12, 2000

[54] BATTERY CHARGER WITH DETACHABLE MECHANICAL ADAPTERS AND FOLD-OUT CONNECTORS

[75] Inventors: Jacques H. Helot, San Mateo, Calif.; Michael D. Derocher; Robert T. Bliven, both of Corvallis, Oreg.

[73] Assignee: Hewlett-Packard Company, Palo Alto, Calif.

[21] Appl. No.: 09/368,546

[22] Filed: Aug. 4, 1999

[51] Int. Cl.[7] ................................................... H02J 7/00
[52] U.S. Cl. ......................................... 320/119; 320/113
[58] Field of Search .................................. 320/110, 119, 320/112, 113

[56] References Cited

U.S. PATENT DOCUMENTS

| | | | |
|---|---|---|---|
| 4,403,182 | 9/1983 | Yeh | 320/110 |
| 5,039,929 | 8/1991 | Veistroffer et al. | 320/2 |
| 5,200,685 | 4/1993 | Sakamoto | 320/2 |
| 5,420,493 | 5/1995 | Hargadon et al. | 320/106 |
| 5,717,309 | 2/1998 | Cho | 320/15 |
| 5,742,149 | 4/1998 | Simpson | 320/113 |
| 5,783,927 | 7/1998 | Chen | 320/110 |
| 5,801,513 | 9/1998 | Smith et al. | 320/113 |

*Primary Examiner*—Peter S. Wong
*Assistant Examiner*—Gregory J. Toatley, Jr.

[57] ABSTRACT

A battery charger utilizes detachable mechanical adapters, so that the battery charger can operate as a single battery charger or a dual battery charger. The detachable mechanical adapters are battery holders to connect a battery to the battery charger for recharging. Preferably, the battery charger is designed to charge one or two depleted notebook batteries. In the preferred embodiment, the battery charger also operates as an AC/DC converter to provide operating DC from AC, which is derived from AC received from an external source, to a notebook computer that is coupled to the battery charger. The battery charger includes an AC/DC adapter and a charging unit. The charging unit of the battery charger includes a central module and two detachable mechanical adapters. The central module of the charging unit contains battery-charging circuitry that provides the charging current from the received DC to the detachable mechanical adapters. The charging current is used to recharge any notebook batteries that are held by the detachable mechanical adapters. The central module includes two fold-out connectors that can be utilized to physically attach one or both mechanical adapters to the central module. In a first embodiment, the battery compartments of the mechanical adapters are designed to hold a particular type of notebook batteries having a fixed thickness. In a second embodiment, the battery compartments of the mechanical adapters are designed to hold one of two types of notebook batteries having different thicknesses.

18 Claims, 18 Drawing Sheets

BATTERY CHARGER WITH DETACHABLE MECHANICAL ADAPTERS AND FOLD-OUT CONNECTORS

TECHNICAL FIELD

The invention relates generally to battery chargers and more particularly to a battery charger that is designed for charging portable computer batteries.

BACKGROUND ART

Notebook computers, also known as laptop computers, are widely used by persons who require a mobile computer system. Unlike desktop computers, a notebook computer is compact and light, so that it can be easily carried to a meeting or other destinations where computing may be necessary. Furthermore, a notebook computer can operate on a battery, thereby eliminating the need to be constantly connected to an external power supply, i.e., an AC outlet. Although notebook computers are compact, the computational capabilities of notebook computers may be as powerful as their desktop counterparts.

A concern with notebook computers is that a notebook battery typically can last only a few hours. Although advances in battery and circuit designs have increased the operating life of a notebook battery, the mobile use of a notebook computer is still very much limited by the notebook battery life. One way to alleviate this concern is to carry backup batteries. When the power of the installed notebook battery is depleted, the installed notebook battery can be replaced with a fresh backup battery, effectively extending the battery-operated life of the notebook computer. Another way to alleviate the above concern is to carry an AC/DC adapter. The AC/DC adapter can be used to supply external power to the notebook computer and to recharge the installed notebook battery when an AC outlet is available. However, during extended periods when an AC outlet is not available, the only means for continued operation of the notebook computer is utilizing the backup batteries.

Although depleted notebook batteries can be recharged in a separate battery charger, a depleted notebook battery is typically recharged using the notebook computer as a battery charger. This method of recharging a battery using a notebook computer will be described with reference to a conventional power supply configuration 10, which is illustrated in FIG. 1. The conventional power supply configuration utilizes an AC/DC adapter 12 for supplying electrical power to a notebook computer 14 and for recharging an installed notebook battery 16 when it is installed in a battery compartment 18 of the notebook computer. When the AC/DC adapter is connected to an AC outlet, the AC/DC adapter converts the received AC into DC to supply electrical power to the notebook computer. The supplied electrical power is used to provide operating power for the notebook computer. In addition, the supplied electrical power is used to recharge the installed notebook battery.

A disadvantage of the power supply configuration 10 of FIG. 1 is that a backup battery cannot be recharged while the notebook computer 14 is running on the installed battery 16, since the notebook computer can only accommodate a single battery. Another disadvantage is that only one notebook battery can be recharged at a given time. Therefore, in order to recharge multiple notebook batteries, the batteries must be recharged one at a time.

The above-described disadvantages can be alleviated if the notebook computer 14 is a type of notebook computer that includes a slot that can be used for a module drive (e.g., CD-ROM drive or a floppy disk drive) or an extra notebook battery. Using such a notebook computer, it is possible to have two notebook batteries in the notebook computer for recharging. However, the use of the slot for the extra notebook battery is at the expense of the module drive. That is, the user of the notebook computer may not be able to operate a program from a CD or to save a file on a floppy disk when the slot is occupied by the extra notebook battery.

An external battery adapter of interest is described in U.S. Pat. No. 5,200,685 to Sakamoto. The Sakamoto adapter can operate as a battery charger to recharge a notebook battery when the battery adapter is connected to an AC/DC adapter. Alternatively, the Sakamoto adapter can operate as an external power source for a notebook computer when the battery adapter is coupled to the notebook computer, instead of the AC/DC adapter. The adapter of Sakamoto is configured to accommodate a single notebook battery. The Sakamoto adapter allows a backup notebook battery to be recharged while the notebook computer is operating from the installed notebook battery. However, the Sakamoto adapter does not allow multiple notebook batteries to be recharged simultaneously.

Another device of interest is described in U.S. Pat. No. 5,420,493 to Hargadon et al. The device of Hargadon et al. is an integrated device that includes an AC/DC adapter unit and a battery charger unit. The Hargadon et al. device is configured to allow the battery charger unit to be separated from the AC/DC adapter unit. The battery charger unit is structurally configured such that two notebook batteries can be inserted into two accommodating slots of the unit in order to recharge the inserted batteries. Unlike the battery adapter of Sakamoto, the device of Hargadon et al. can simultaneously supply electrical power to a notebook computer and provide charging current to one or two external notebook batteries. The device of Hargadon et al. addresses the above disadvantages related to the conventional power supply configuration 10 of FIG. 1. However, the device of Hargadon et al. is relatively bulky, making it difficult to pack the device in a suitcase when traveling, especially if the device is being used to recharge only a single backup battery. Furthermore, since the slots of the battery charger unit have fixed dimensions, only notebook batteries of one particular size that can be recharged by the battery charger unit of the Hargadon et al. device.

In light of these concerns, what is needed is a compact battery charging device that can recharge more than one notebook battery of different sizes, as well as supply power to a coupled notebook computer, and be of a compact size in order to be easy to pack.

SUMMARY OF THE INVENTION

A battery charger utilizes detachable mechanical adapters, so that the device can operate as a single battery charger or a dual battery charger. The detachable mechanical adapters are battery holders to connect a battery to the battery charger for recharging. Preferably, the battery charger is designed to charge one or two depleted notebook batteries. In the preferred embodiment, the battery charger also operates as an AC/DC converter to provide operating DC, which is derived from AC received from an external source, to a notebook computer that is coupled to the battery charger.

The battery charger includes an AC/DC adapter, a charging unit and a separable cord. The AC/DC adapter includes an electrical cord that has an electrical plug that can be coupled to an AC outlet and a connector that can either be inserted into a compatible plug on a "T" connector of the charging unit or inserted directly into a plug on a notebook computer. The separable cord includes a first connector that can be inserted into the plug on the notebook computer and a second connector that can be inserted into a second plug on the "T" connector of the charging unit. The separable cord is utilized to connect the charging unit and the AC/DC adapter to the notebook computer, when the AC/DC adapter is coupled to the charging unit.

The AC/DC adapter of the battery charger contains circuitry for converting AC to a predefined DC. The DC is transmitted to the charging unit that operates to generate charging current. The charging current is used by the charging unit to recharge any notebook batteries that are connected to the charging unit. The DC from the AC/DC adapter can also be routed to a coupled notebook computer via the electrical cord to provide operating power to the notebook computer. The AC/DC adapter is a separate device from the charging unit. In an alternative configuration, the charging unit includes the circuitry for converting AC to DC. In this alternative configuration, the charging unit also performs the function of the AC/DC adapter.

The charging unit of the battery charger includes a central module and two detachable mechanical adapters. The central module of the charging unit contains battery-charging circuitry that provides the charging current from the received DC to the detachable mechanical adapters. The central module includes two fold-out connectors that are used to physically attach one or both mechanical adapters to the central module. Each of the fold-out connectors has a region of electrical contacts that can be coupled to a compatible region of electrical contacts on the bottom of the detachable mechanical adapters. The connection provided by these electrical contacts when the mechanical adapters are attached to the central module allows the charging current to flow to the attached mechanical adapters from the central module in order to recharge any notebook batteries that are connected to the mechanical adapter.

The type and size of the notebook battery that can be recharged by the battery charger depend on the structural configuration of the battery compartments of the mechanical adapters that are attached to the central module of the charging unit. In a first embodiment, the battery compartments of the mechanical adapters are designed to hold a particular type of notebook batteries having a fixed thickness. In a second embodiment, the battery compartments of the mechanical adapters are designed to hold one of two types of notebook batteries having different thicknesses. In an alternative embodiment, the mechanical adapters are merely "shells" to hold the notebook batteries. In this alternative embodiment, the notebook battery is electrically connected directly to the fold-out connector of the central module, instead of being connected to the fold-out connector of the central module via the mechanical adapter.

An advantage of the battery charger is that the battery charger can be configured as a single battery charger or a dual battery charger, not only operationally but also structurally. When operating as a single battery charger, only one mechanical adapter is needed to be attached to the central module of the charging unit, which is a significant reduction in size when compared to the charging unit having two attached mechanical adapters.

Another advantage is that the charging unit of the battery charger can be fully disassembled into the central module and the two detachable mechanical adapters. This feature allows the battery charger to be packed more efficiently for transportation.

Still another advantage is that the detachable mechanical adapters are interchangeable. Thus, the types of notebook batteries that can be recharged by the battery charger are virtually unlimited, as long as there are mechanical adapters that are configured to be compatible with the different types of notebook batteries and the battery charger is electrically compatible with the batteries.

DETAILED DESCRIPTION

Figure 1:
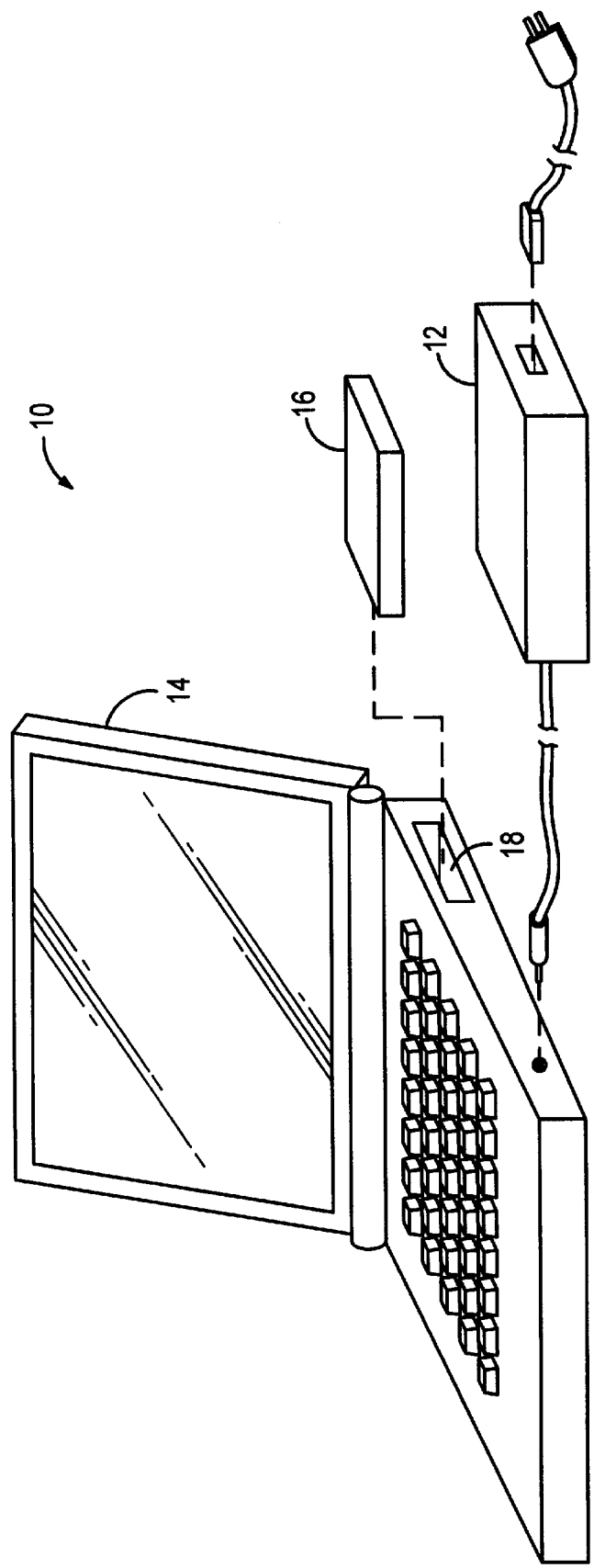
FIG. 1 is a conventional power supply configuration that can be used to recharge a notebook battery installed in a notebook computer.
Figure 2:
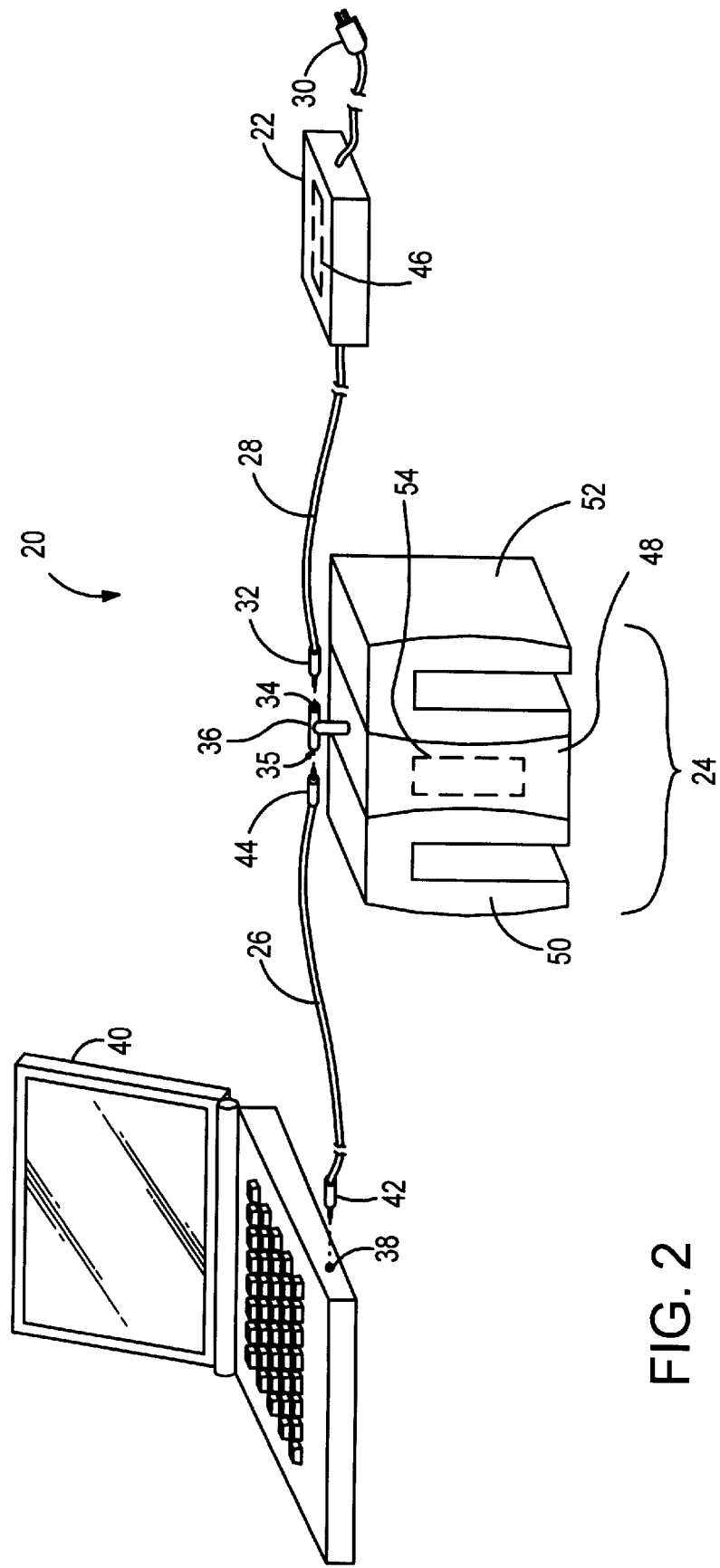
FIG. 2 is a perspective view of a battery charger in accordance with the present invention that can be connected to a notebook computer.

With reference to FIG. 2, a battery charger 20 in accordance with the present invention is shown. The battery charger 20 includes an AC/DC adapter 22, a charging unit 24 and a separable cord 26. The AC/DC adapter includes an electrical cord 28 that has an electrical plug 30 that can be inserted into an outlet socket to receive AC and a connector 32 that can either be inserted into a compatible plug 34 on a "T" connector 36 of the charging unit 24 or inserted directly into a plug 38 on a notebook computer 40. The separable cord 26 includes a first connector 42 that can be inserted into the plug 34 on the notebook computer and a second connector 44 that can be inserted into a plug 35 on the "T" connector 36 of the charging unit 24. The separable cord 26 is utilized to connect the charging unit 24 and the AC/DC adapter 22 to the notebook computer 40, when the AC/DC adapter is coupled to the charging unit.

The battery charger 20 can operate as a conventional AC/DC converter to supply operating power to the connected notebook computer 40. In addition, the battery charger can simultaneously operate as a conventional battery charger to recharge one or two depleted notebook batteries. However, the battery charger can also operate exclusively as a conventional battery charger to recharge depleted notebook batteries. In this exclusive operation, the separable cord 26 can be removed, i.e., separated from the charging unit and the notebook computer, since the separable cord is not needed to connect the AC/DC adapter 22 to the notebook computer. As will be described below, the charging unit 24 of the battery charger can accommodate notebook batteries of different sizes and types. Furthermore, the charging unit can be fully or partially disassembled, depending on the current use of the charging unit.

The AC/DC adapter 22 of the battery charger 20 contains circuitry 46 for converting AC from an external source to a predefined DC in order to provide operating power to the notebook computer 40. The AC/DC adapter also supplies the necessary power to the charging unit 24 of the battery charger to recharge any notebook batteries that are coupled to the charging unit.

The charging unit 24 includes a central module 48 and two detachable mechanical adapters 50 and 52. The central module of the charging unit contains battery-charging circuitry 54 for providing charging current to the two detachable mechanical adapters to recharge any notebook batteries that are held by the mechanical adapters. In an alternative configuration, the central module also contains the circuitry 46 for converting AC to DC. In this alternative configuration, the AC/DC adapter 22 is no longer a necessary component of the battery charger 20 and can be replaced with an ordinary electrical cord that can connect the charging unit 24 to an AC power source.

Figure 5:
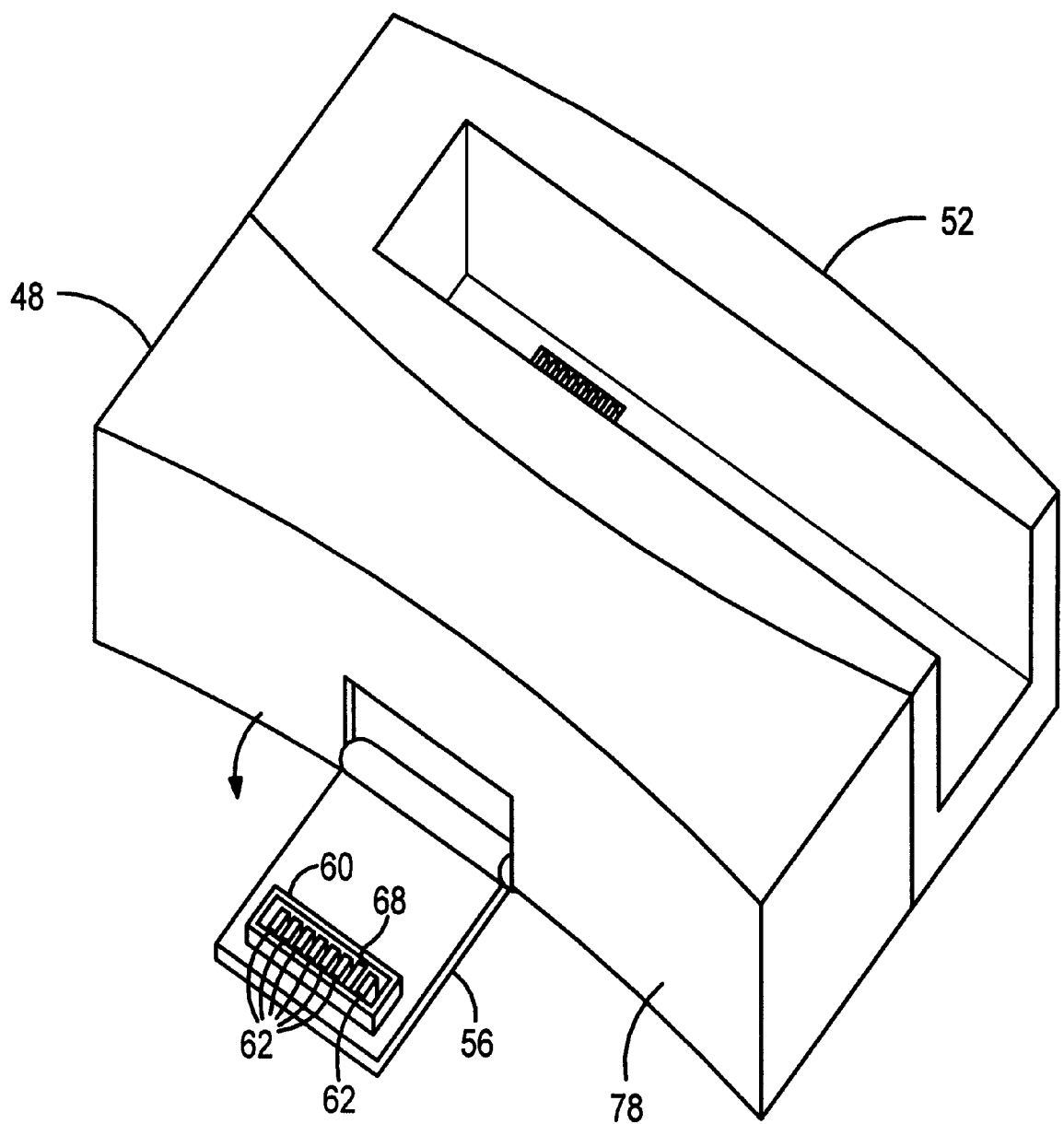
FIG. 5 is a perspective view of the central module of FIGS. 3 and 4 with only one attached mechanical adapter.
Figure 6:
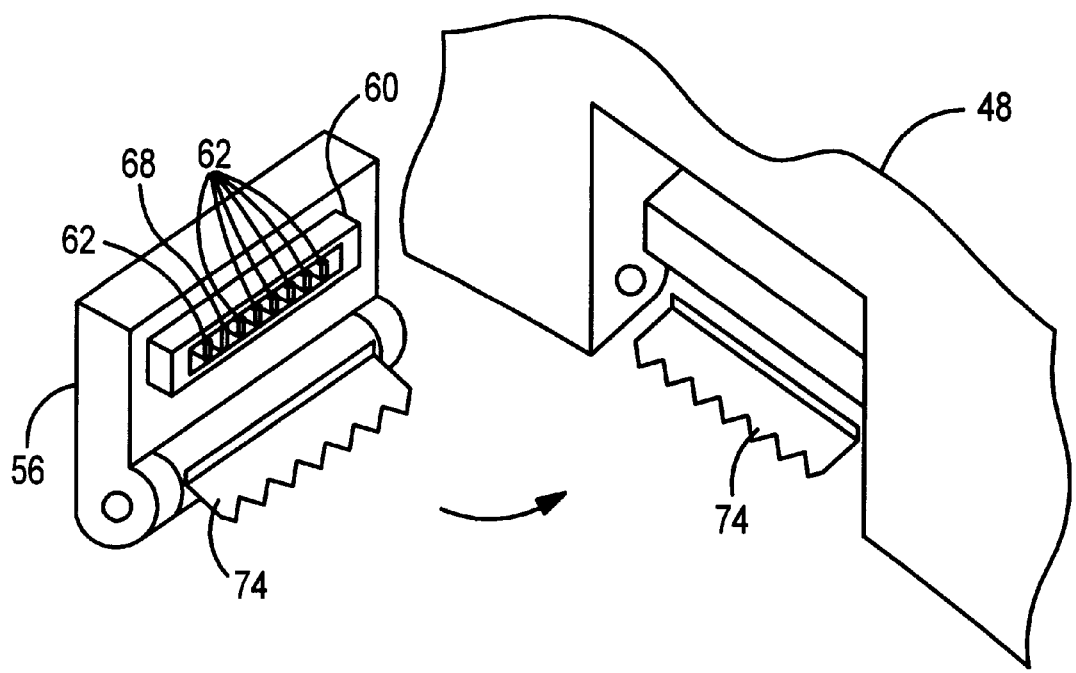
FIG. 6 is a perspective view of a fold-out connector that is separated from the central module.
Figure 7:
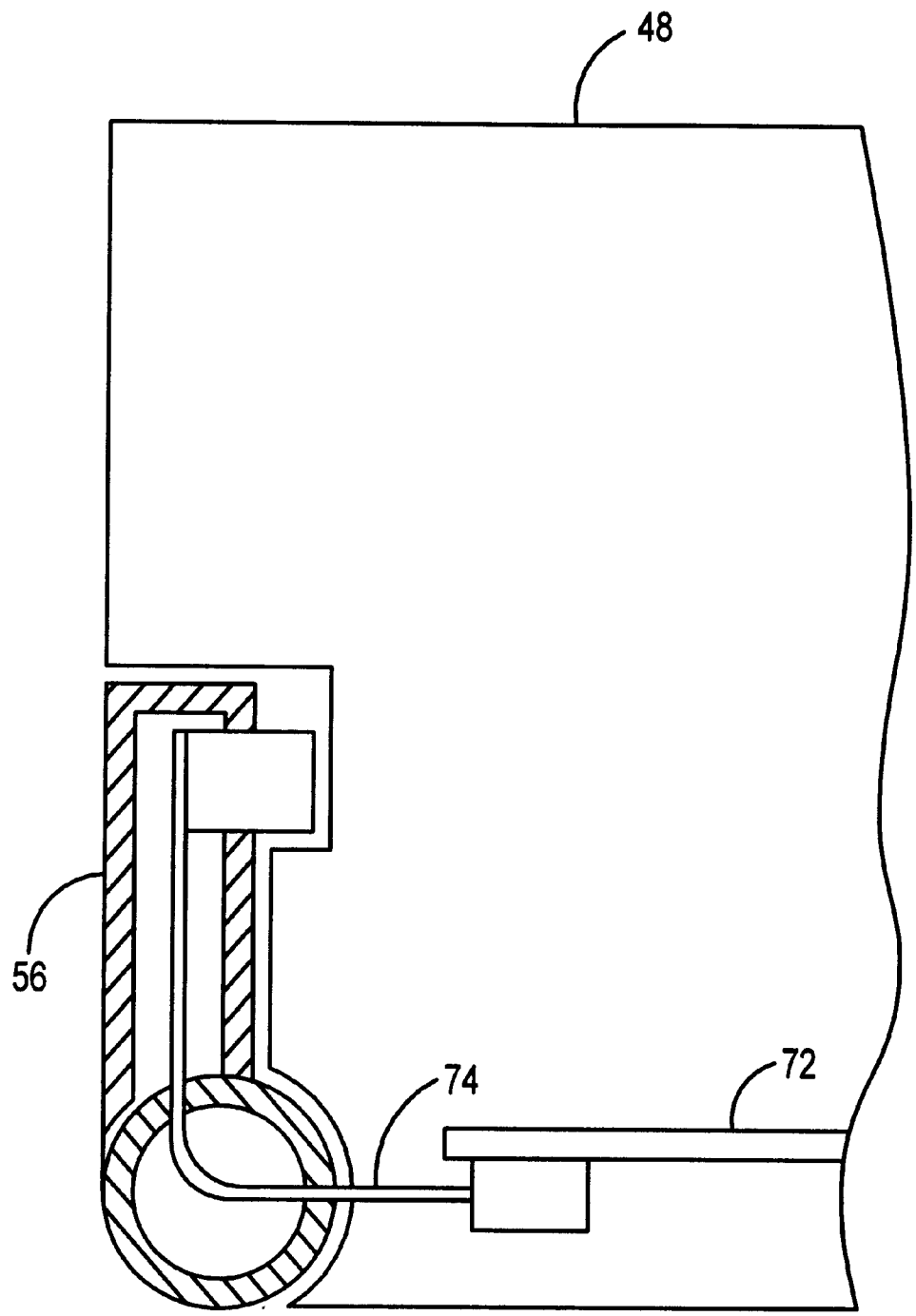
FIG. 7 is a cross-sectional view of a fold-out connector of the central module in the raised position.
Figure 8:
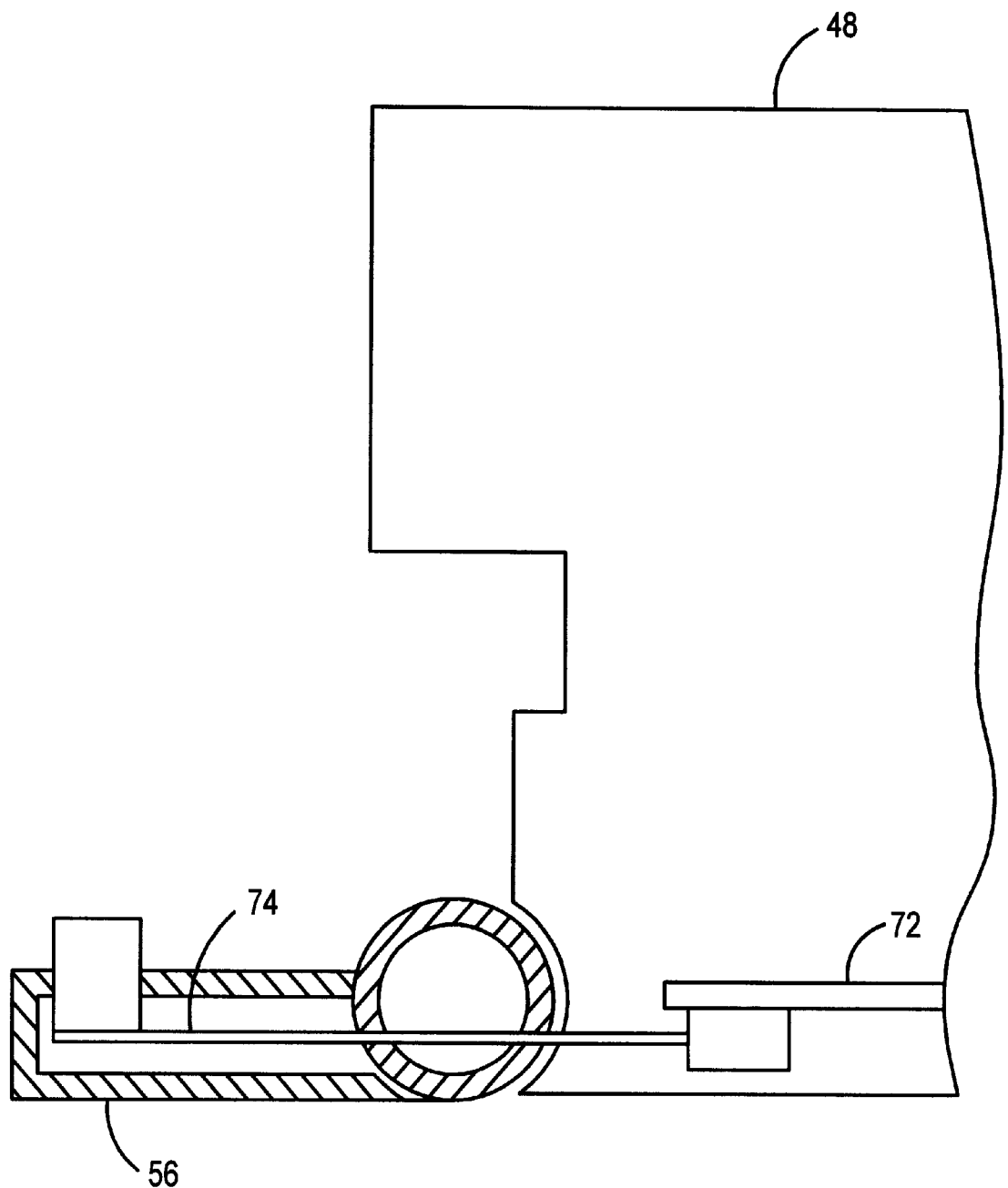
FIG. 8 is a cross-sectional view of the fold-out connector of the central module in the lowered position.

The central module 48 of the charging unit 24 includes fold-out connectors 56 and 58, as shown in FIGS. 3, 4, 5, 6, 7 and 8. The fold-out connectors of the central module are used to physically attach one or both mechanical adapters 50 and 52 to the central module. Each of the fold-out connectors has a region 60 (most clearly shown in FIG. 4) of electrical contacts 62 that can be coupled to a compatible region 64 (shown in FIG. 11) of electrical contacts 66 on the detachable mechanical adapters. In an exemplary embodiment, the region 60 of the fold-out connectors includes seven protruding electrical contacts 62 and a protruding plastic notch 68, while the region 64 of the detachable mechanical adapters includes seven recessed electrical contacts 66 and a plug 70 for the plastic notch 68 of the fold-out connectors. The electrical contacts 62 of each fold-out connector are electrically coupled to an electronic board 72 of the central module by a flex cable 74, as illustrated in FIGS. 6–8 which show cross-sections of the fold-out connector 56 and a partial cross-section of the central module.

In FIG. 6, the fold-out connector 56 is separately depicted from the central module 48 to show the configuration of the fold-out connector 56 and the central module. The electronic board 72 includes the battery-charging circuitry 54 that generates charging current from received DC. The connections provided by these electrical contacts 62 and 66 when one or both the mechanical adapters 50 and 52 are attached to the central module allow the charging current to flow from the central module to the attached mechanical adapters in order to recharge any notebook batteries that are connected to the mechanical adapters.

Figure 3:
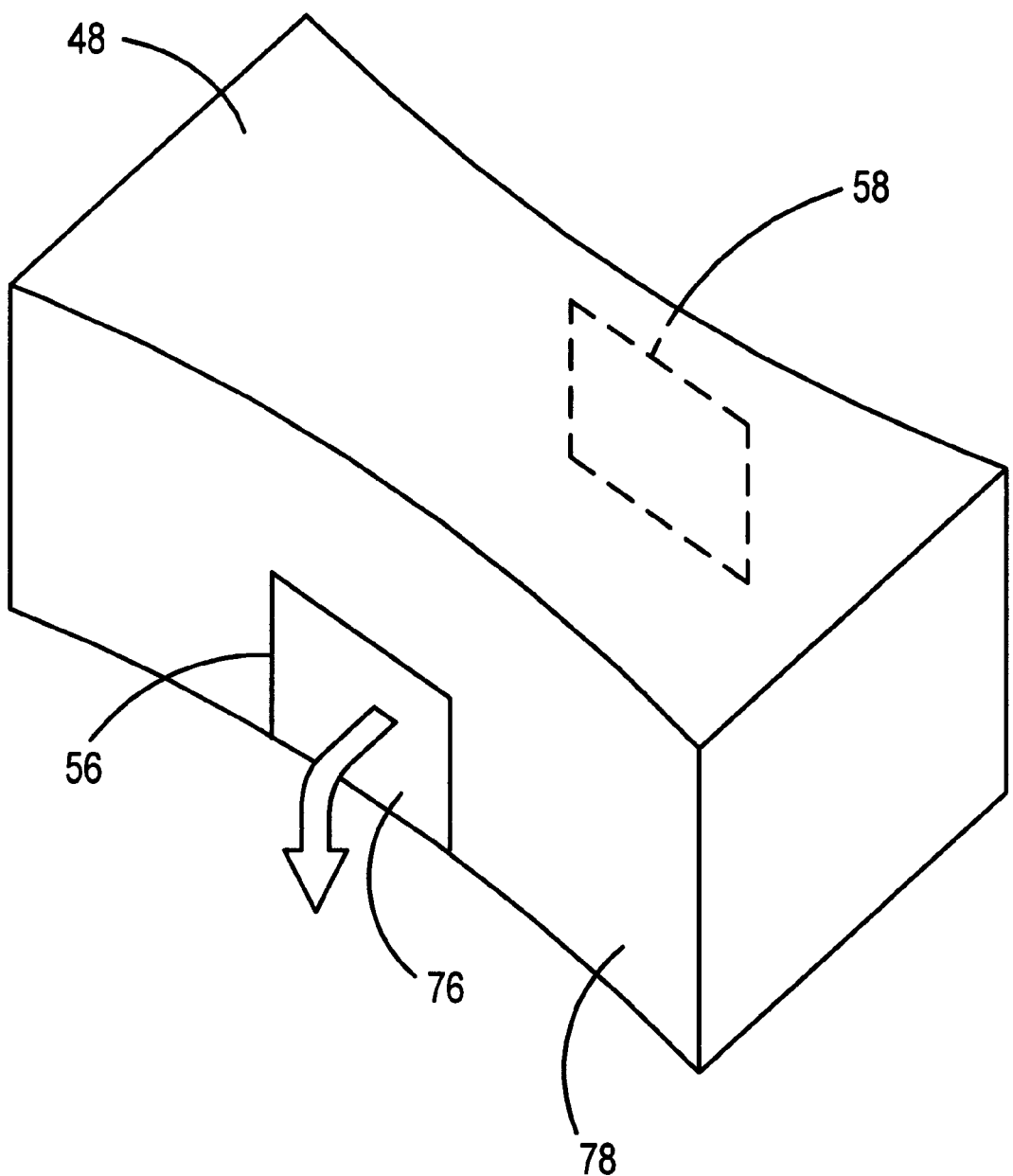
FIG. 3 is a perspective view of a central module of the battery charger of FIG. 2 with fold-out connectors in the raised position.
Figure 4:
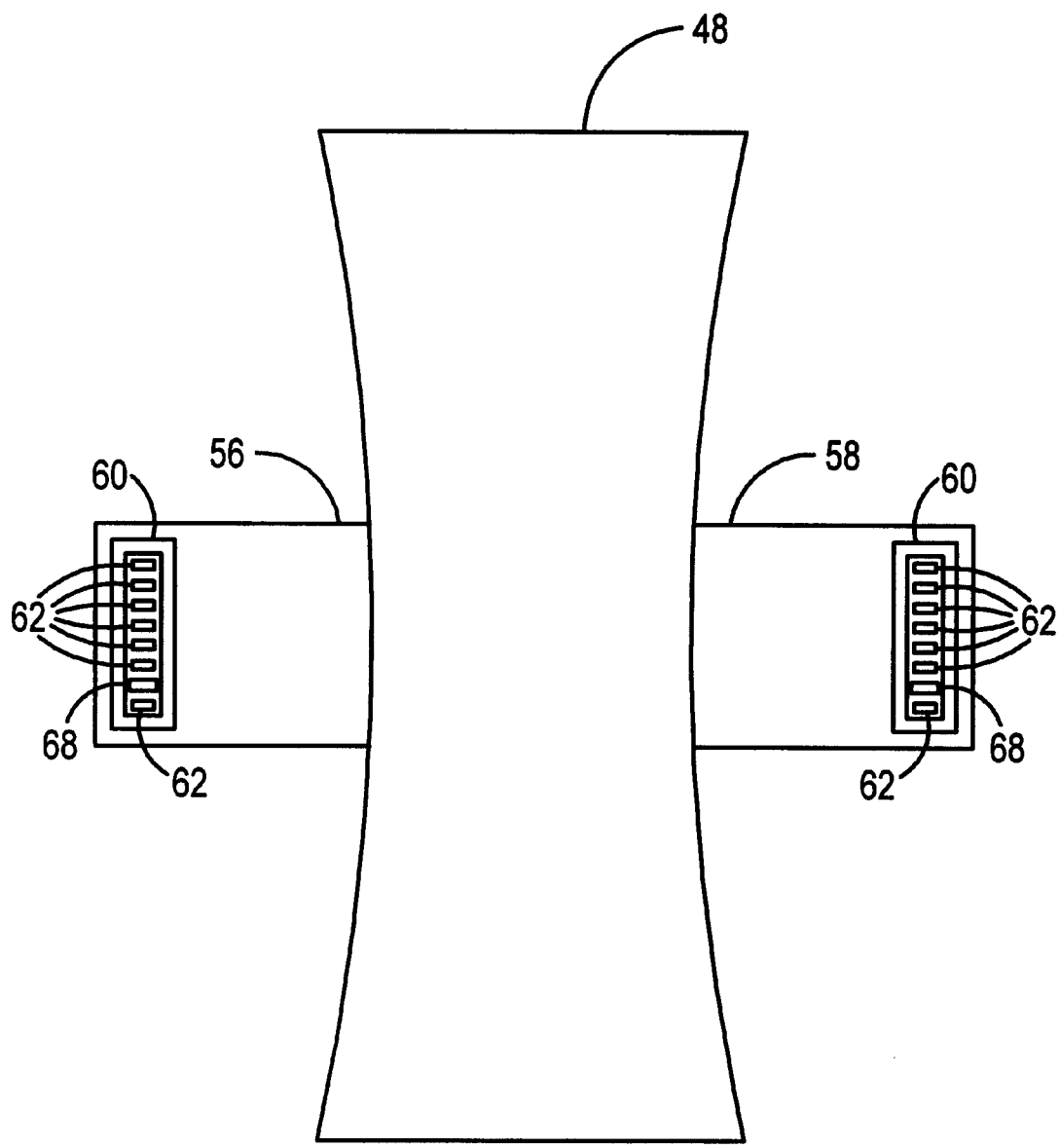
FIG. 4 is a top view of the central module of the battery charger of FIG. 2 with the fold-out connectors in the lowered position.

The fold-out connectors 56 and 58 of the central module 48 are configured so that they can be pivoted about the bottom side of the fold-out connectors. This allows the fold-out connectors to be raised and lowered in a drawbridge-like manner, as illustrated by FIGS. 3–5, 7 and 8. In FIGS. 3 and 7, the fold-out connectors 56 and 58 are shown to be pivoted to a raised position, while the fold-out connectors are shown to be pivoted to a lowered position in FIGS. 4 and 8. Since both fold-out connectors operate in an identical manner, only the fold-out connector 56 will be described with respect to its pivoting feature. In the raised position, an external surface 76 of the fold-out connector 56 is flush with a side surface 78 of the central module 48, such that the region 60 of electrical contacts 62 of the fold-out connector 56 is hidden within the central module, as illustrated in FIGS. 3 and 7. In the lowered position, the external surface 76 of the fold-out connector 56 is generally perpendicular to the side surface 78 of the central module, as illustrated in FIGS. 5 and 8. The fold-out connectors of the central module can be pivoted independently from one another. That is, one fold-out connector can be pivoted to the lowered position, while the other fold-out connector is pivoted to the raised position.

Figure 9:
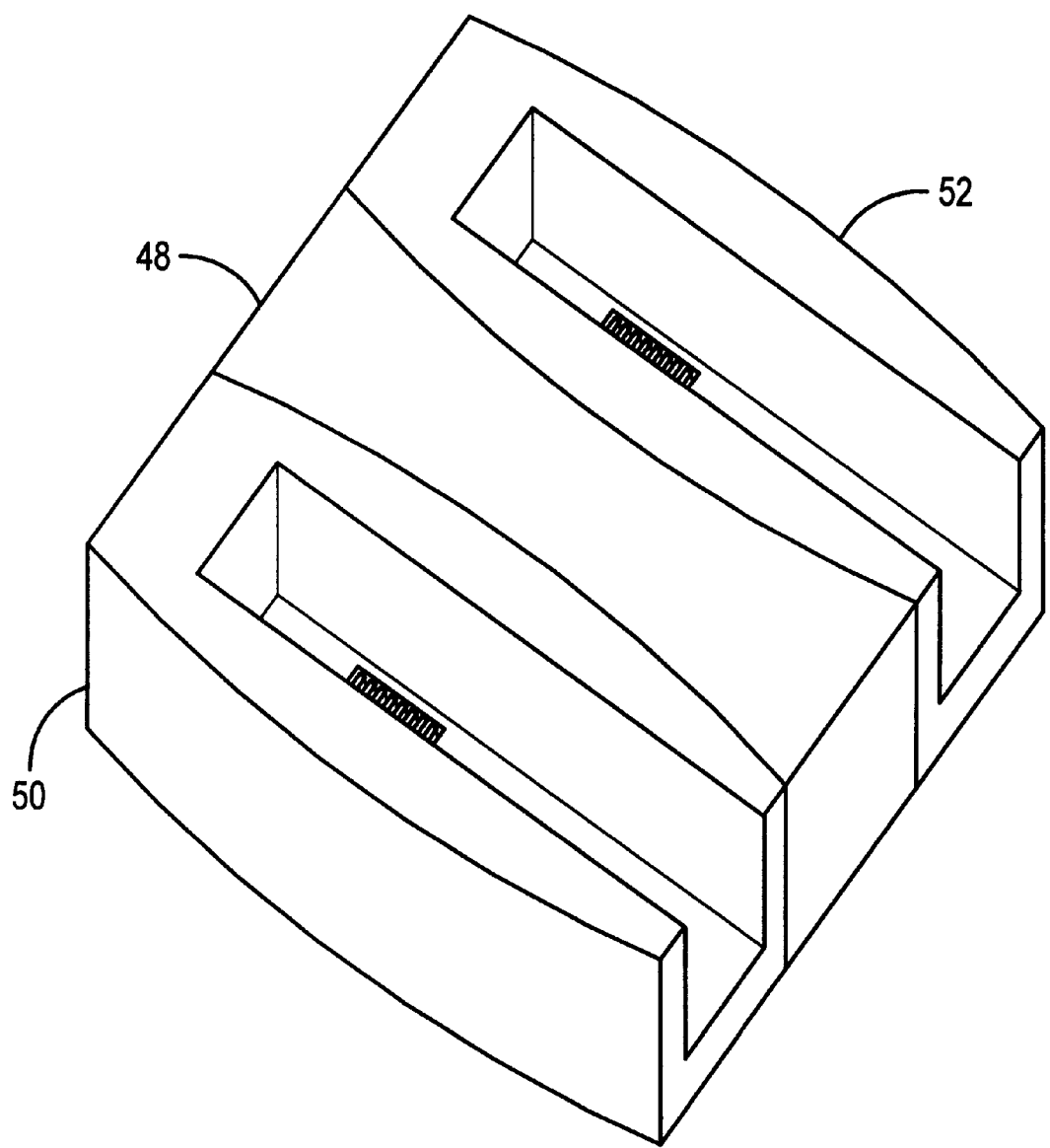
FIG. 9 is a perspective view of the central module of FIGS. 3 and 4 with two attached mechanical adapters.

When one of the fold-out connectors 56 and 58 of the central module 48 is in the lowered position, the detachable mechanical adapter 50 or 52 can be attached to that fold-out connector, such that the attached mechanical adapter becomes integrated with the central module to form the charging unit 24 of the battery charger 20. The charging unit can be assembled to have one or both mechanical adapters, depending on the number of notebook batteries to be recharged by the battery charger. For applications in which only one notebook battery needs to be recharged by the battery charger, the charging unit can be configured to have only one mechanical adapter 52, as shown in FIG. 5. When two notebook batteries need to be recharged, the charging unit can be configured to have both mechanical adapters 50 and 52, as shown in FIG. 9. Thus, the battery charger 20 can be structurally configured as a single battery charger or a dual battery charger. Although the mechanical adapters 50 and 52 are shown in FIG. 6 as attached to the right and left sides of the central module, respectively, the mechanical adapters can be interchangeably attached to either side of the central module because they are identical.

During times in which one or both fold-out connectors 56 and 58 are not in use, the fold-out connector(s) can be pivoted to the raised position. The ability to pivot the fold-out connectors to the raised position allows the battery charger 20 to be packed more efficiently for transportation when the charging unit 24 is fully disassembled.

Figure 10:
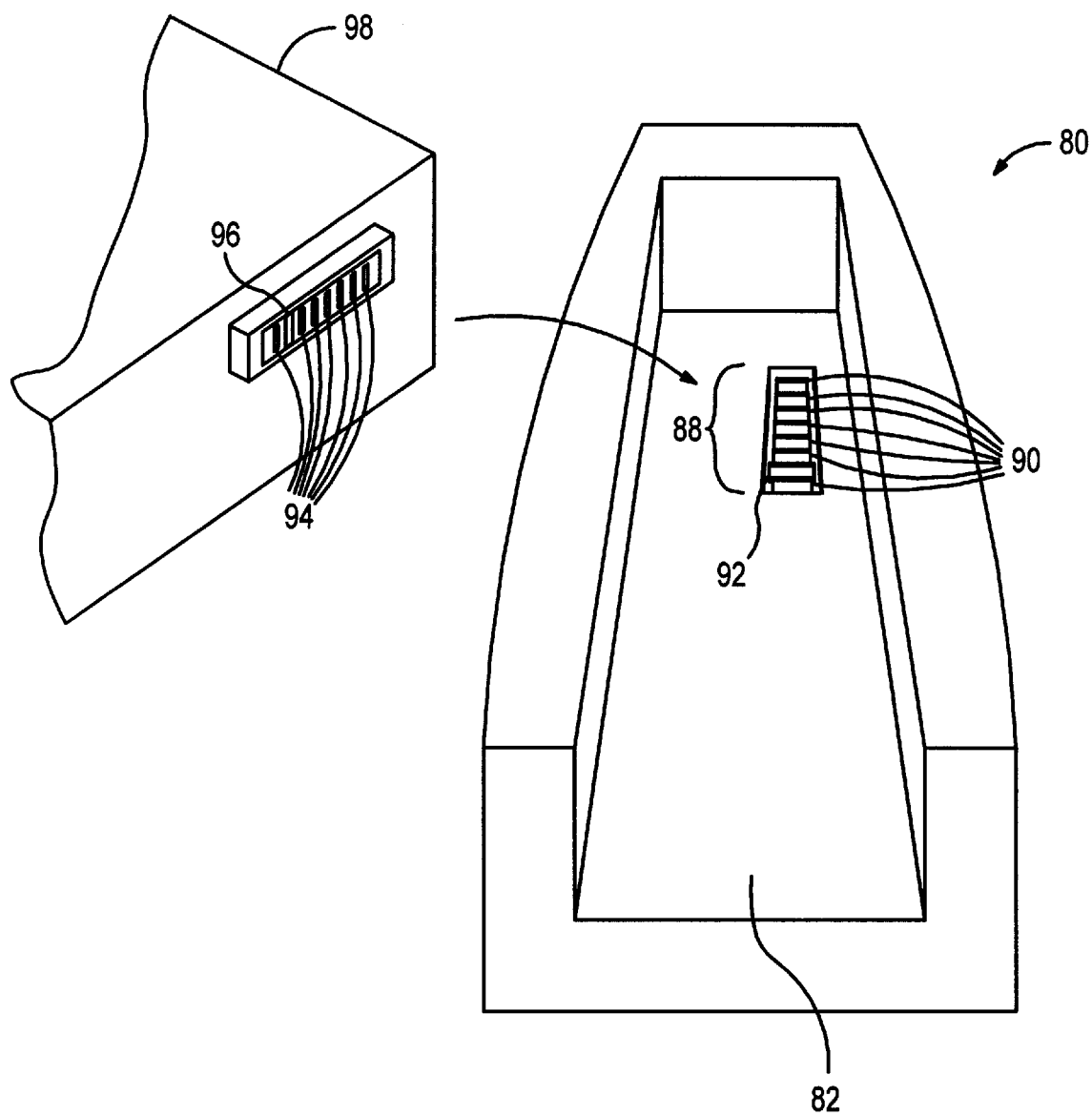
FIG. 10 is a perspective view of a detachable mechanical adapter in accordance with a first embodiment of the invention, showing the battery compartment of the mechanical adapter.
Figure 11:
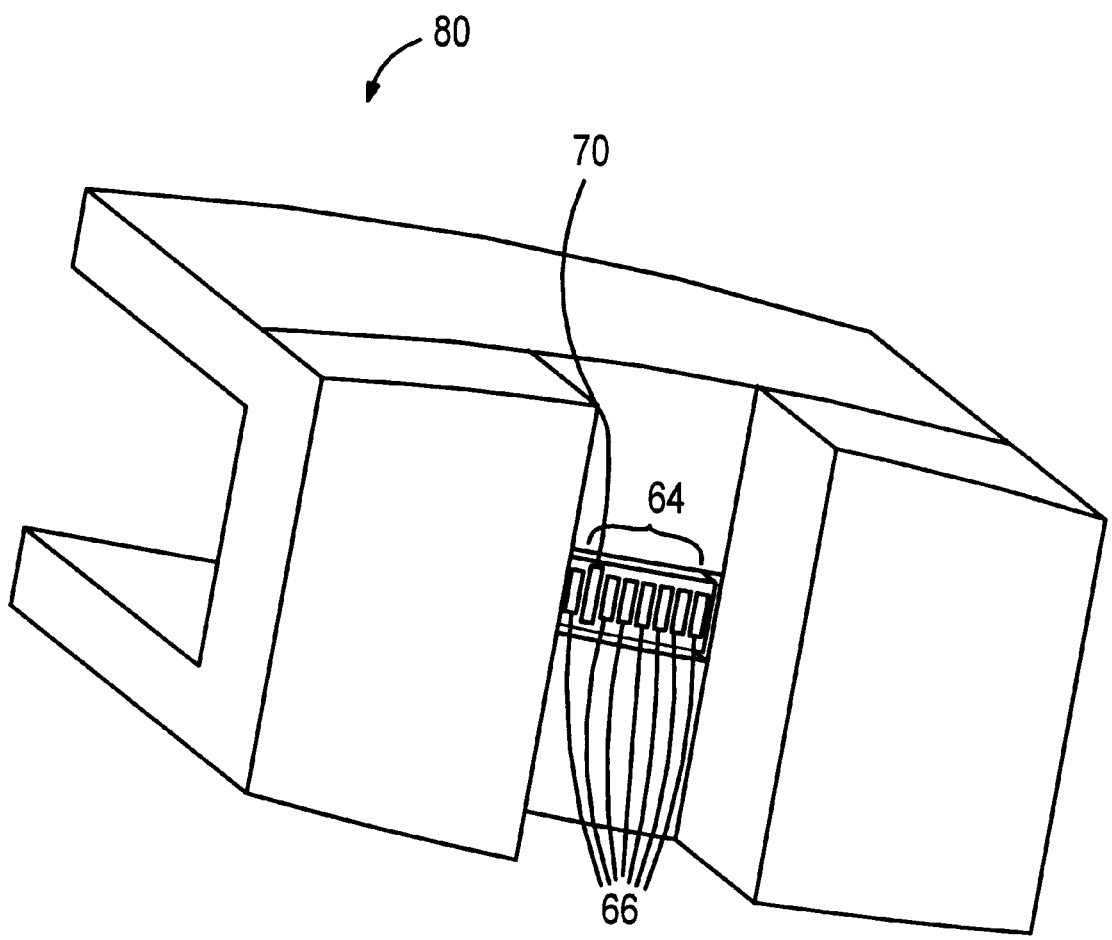
FIG. 11 is a perspective view of the mechanical adapter of FIG. 10, showing the bottom side of the mechanical adapter.
Figure 12:
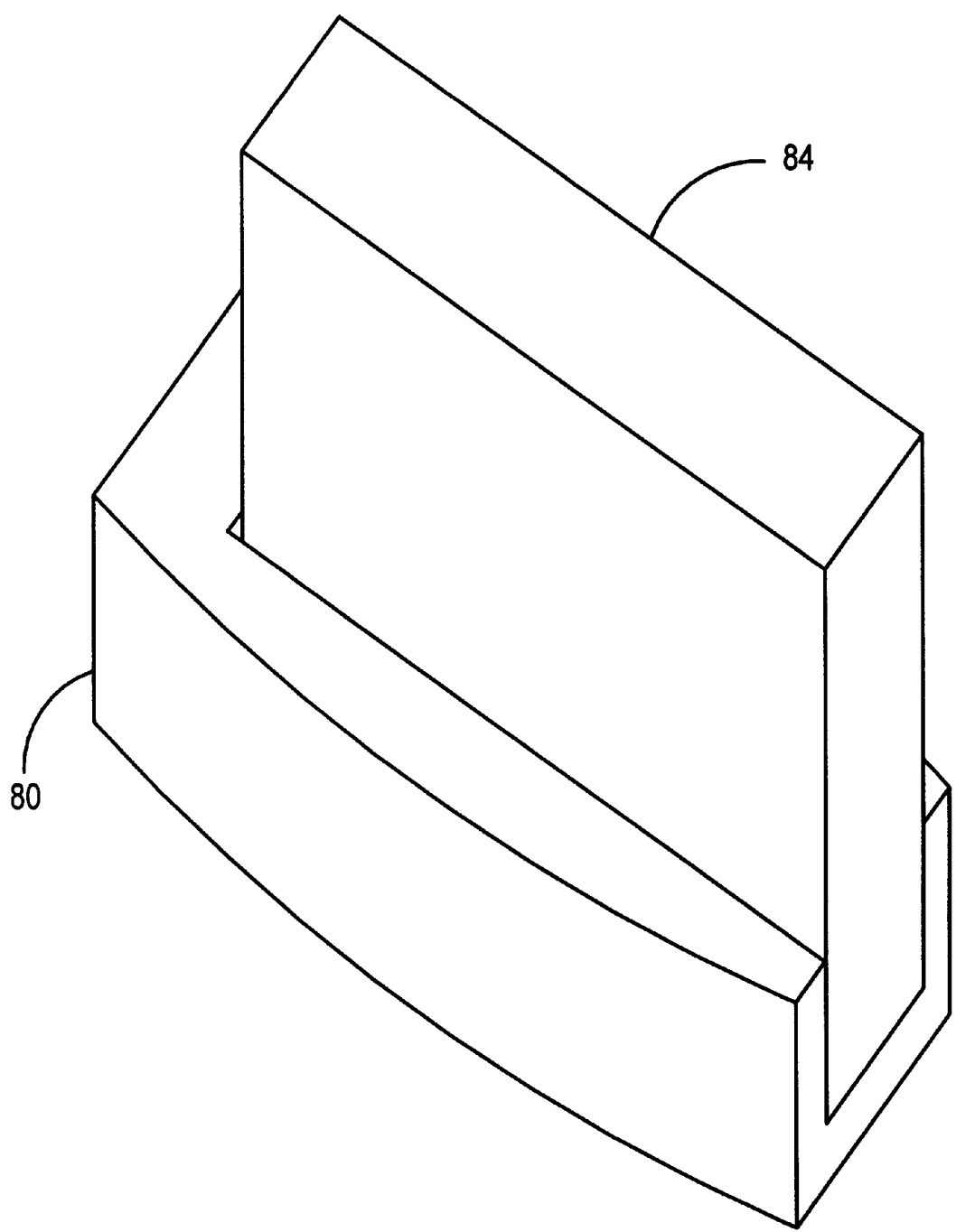
FIG. 12 is a perspective view of the mechanical adapter of FIG. 10 that is accommodating a small-sized battery.
Figure 13:
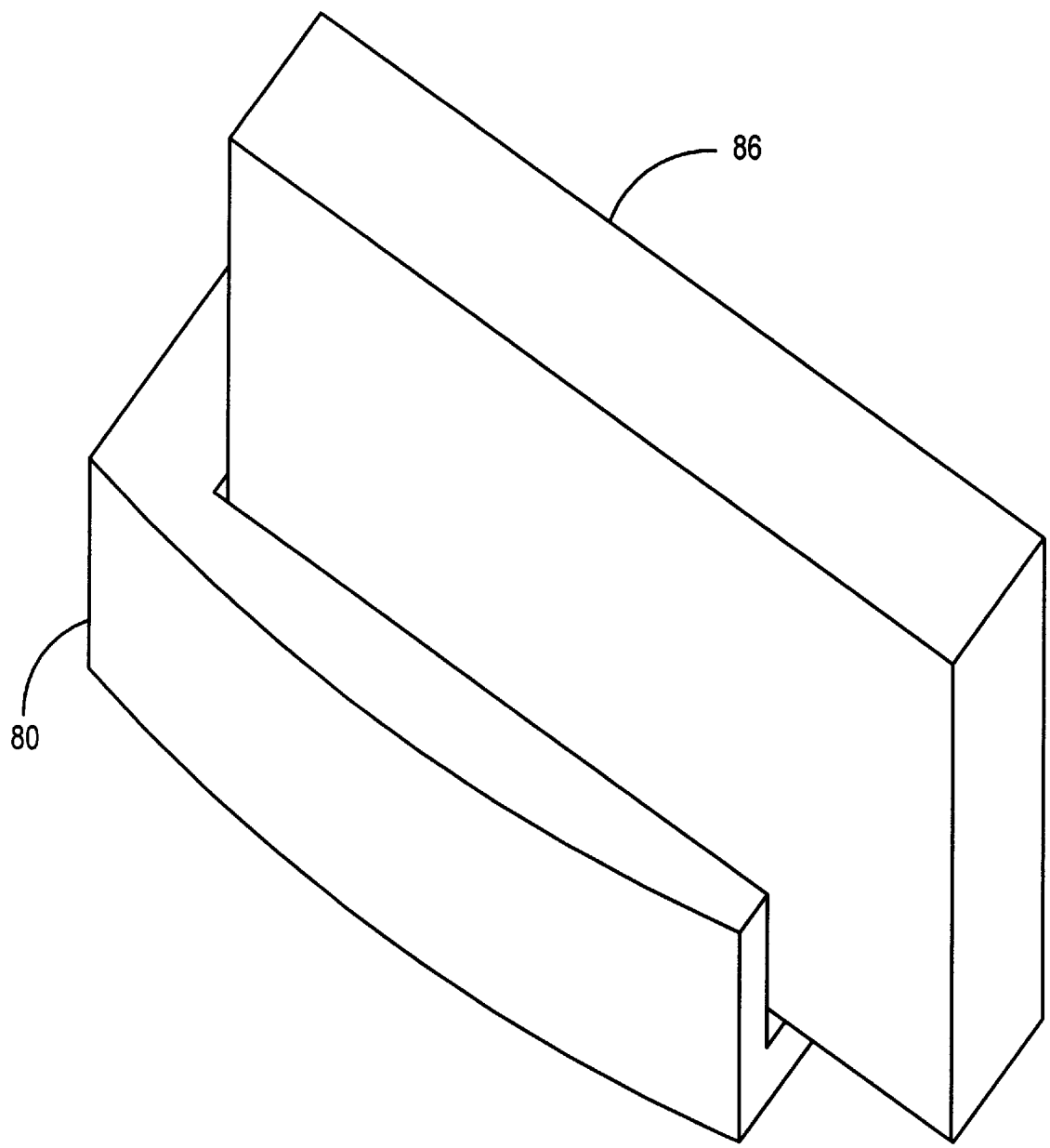
FIG. 13 is a perspective view of the mechanical adapter of FIG. 10 that is accommodating a large-sized battery.

The type and size of the notebook batteries that can be recharged by the battery charger 20 will depend on the structural configuration of the mechanical adapters 50 and 52 that are attached to the central module 48 of the charging unit 24. The mechanical adapters 50 and 52 may be mechanical adapters in accordance with a first or a second embodiment of the invention. Turning now to FIGS. 10 and 11, a detachable mechanical adapter 80 in accordance with the first embodiment of the present invention is shown. FIG. 10 is a top perspective view of the mechanical adapter 80, while FIG. 11 is a bottom perspective view of the mechanical adapter. The mechanical adapter is structurally configured to form a partial battery compartment 82, as shown in FIG. 10. The partial battery compartment of the mechanical adapter allows the mechanical adapter to accommodate a small notebook battery 84, as illustrated in FIG. 12, and to also accommodate a larger notebook battery 86, as illustrated in FIG. 13. The dimensions of the battery compartment are such that the battery compartment can accommodate a notebook battery of a particular thickness. The specific dimensions of the battery compartment are not critical to the invention. Therefore, the dimensions of the battery compartment can be tailored to accommodate notebook batteries of a desired thickness. The mechanical adapter 80 includes a region 88 of battery contacts 90, located within the battery compartment 82.

In the exemplary embodiment, the region 88 of the battery compartment 82 includes seven protruding battery contacts 90 and a protruding plastic notch 92 that can mate with corresponding battery contacts 94 and a plug 96 of a notebook battery 98 that is to be accommodated by the mechanical adapter 80, as shown in FIG. 10. The battery contacts 90 located in the battery compartment of the mechanical adapter 80 are electrically connected to the electrical contacts 66 located on the bottom of the mechanical adapter 80. The electrical contacts 66 of the mechanical adapter 80 are shown in FIG. 11. The specific location of the battery contacts 90 within the battery compartment 82 of the mechanical adapter, as well as the shape of the battery contacts 90, may vary, depending on the particular type of notebook batteries that are to be accommodated by the mechanical adapter.

The bottom of the mechanical adapter 80 is shaped to fit one of the fold-out connectors 56 and 58 of the central module 48 when the mechanical adapter 80 is attached to the central module, as illustrated in FIG. 11. This shape of the mechanical adapter 80 allows the mechanical adapter to be attached to either the right or the left side of the central module 48 without the need to reorientate the mechanical adapter with respect to the central module.

Figure 14:
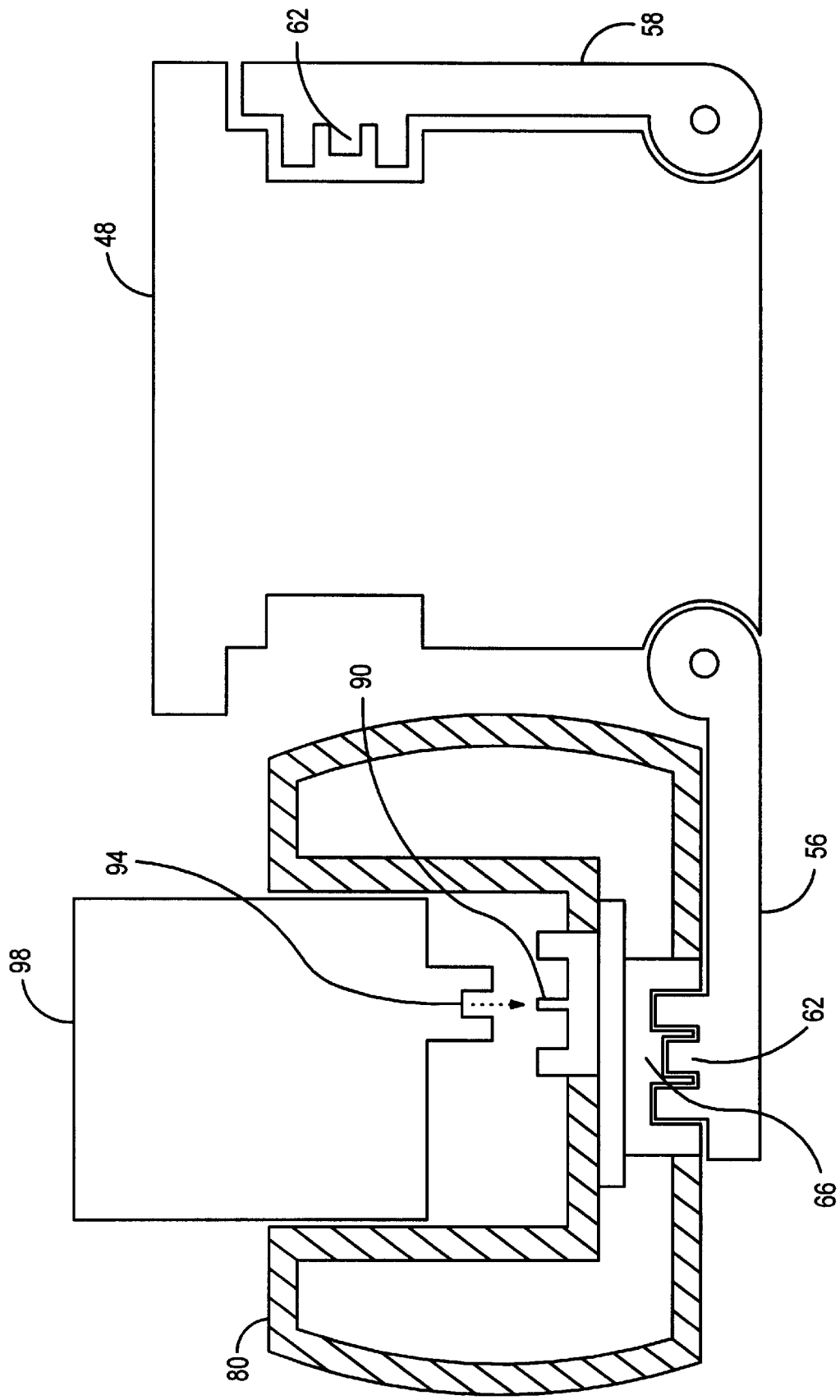
FIG. 14 is a cross-sectional view of the mechanical adapter of FIG. 10 attached to a fold-out connector of the central module.

The cross-sectional view of FIG. 14 illustrates the manner in which the mechanical adapter 80 can be attached to the central module 48. In FIG. 14, the mechanical adapter is attached to the fold-out connector 56 of the central module, such that the protruding electrical contacts 62 of the fold-out connector are mated with the recessed electrical contacts 66 of the mechanical adapter. After the mechanical adapter is attached to the central module, the notebook battery 98 can be coupled to the mechanical adapter, such that the battery contacts 90 of the mechanical adapter are mated with the corresponding battery contacts 94 of the notebook battery 98.

Since the type of notebook batteries, including their size, that can be accommodated by the battery charger 20 depends on the mechanical adapters that are attached to the central module 48, the battery charger may be modified so that it can recharge a different type of notebook batteries by simply replacing one or both attached mechanical adapters with mechanical adapters that can accommodate the different type of notebook batteries. It is also possible to simultaneously recharge two different types of notebook batteries using the battery charger 20 by attaching both a mechanical adapter that can accommodate the first type of notebook batteries and a mechanical adapter that can accommodate the second type of notebook batteries.

Figure 15:
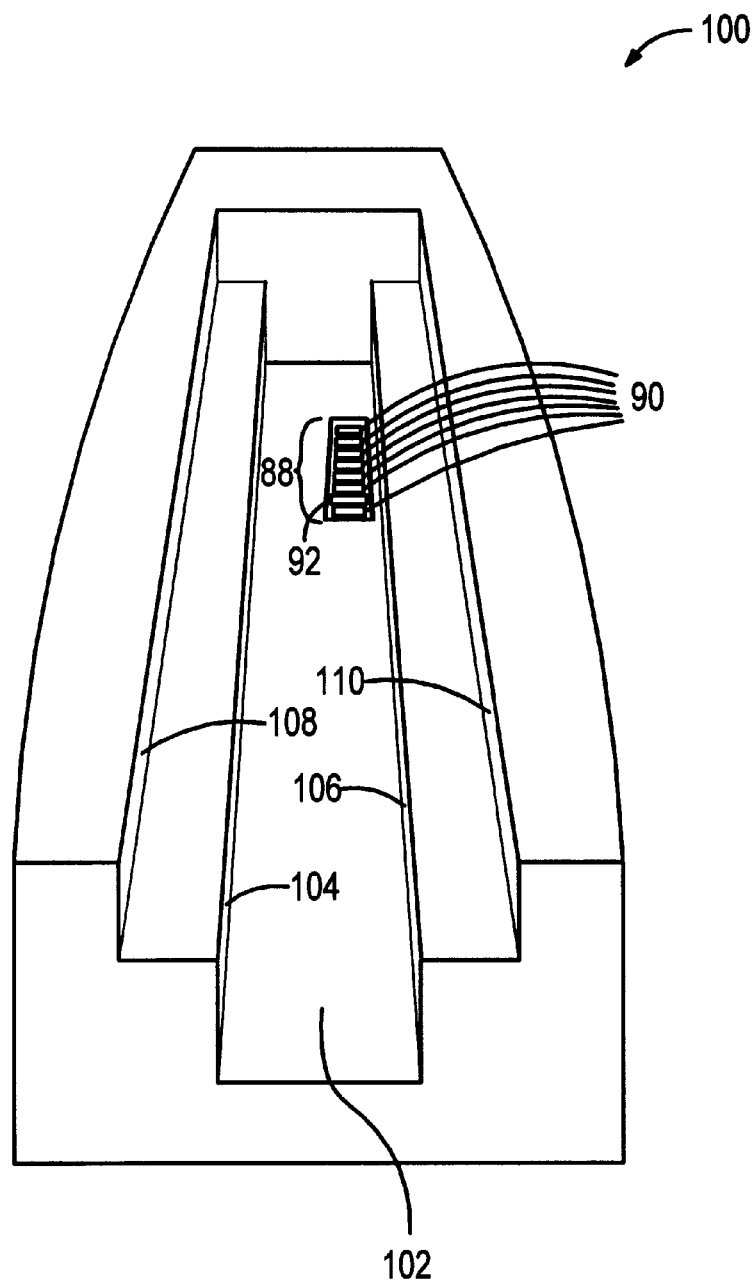
FIG. 15 is a perspective view of a mechanical adapter in accordance with a second embodiment of the invention.

FIG. 15 shows a mechanical adapter 100 in accordance with the second embodiment of the present invention. Unlike the mechanical adapter 80 of FIG. 10, which is designed to accommodate a particular type of notebook batteries, the mechanical adapter 100 is designed to accommodate one of two different types of notebook batteries. The mechanical adapter 100 includes a battery compartment 102 that is formed by four distinct walls. The walls 104 and 106 define a lower region within the battery compartment of the mechanical adapter, while the walls 108 and 110 define an upper region. The lower region of the battery compartment is narrower than the upper region. The lower region allows a first type of notebook batteries to fit in the battery compartment of the mechanical adapter, while the upper region allows a second type of notebook batteries to fit in the battery compartment. Thus, the mechanical adapter can accommodate either the first type notebook battery or the second type notebook battery.

The mechanical adapter 100 includes the region 88 of battery contacts 90. Similar to the mechanical adapter 80 of FIG. 10, the shape and location of these battery contacts are shown in FIG. 15 only for illustrative purposes. The exact shape and location of the battery contacts on the mechanical adapter 100 can vary depending on the types of notebook batteries that are to be accommodated by the mechanical adapter. In the exemplary embodiment, the region 88 of the mechanical adapter 100 includes seven protruding battery contacts 90 and a protruding plastic notch 92. The battery contacts 90 are designed to be electrically connected to the notebook battery of the first type that will fit in the lower region of the battery compartment 102, as well as the notebook battery of the second type that will fit in the upper region of the battery compartment. If two mechanical adapters, such as the mechanical adapter 100, are attached to the central module 48, the battery charger 20 may be able to recharge up to two notebook batteries that are selected from four different types of notebook batteries using only the two attached mechanical adapters.

Figure 16:
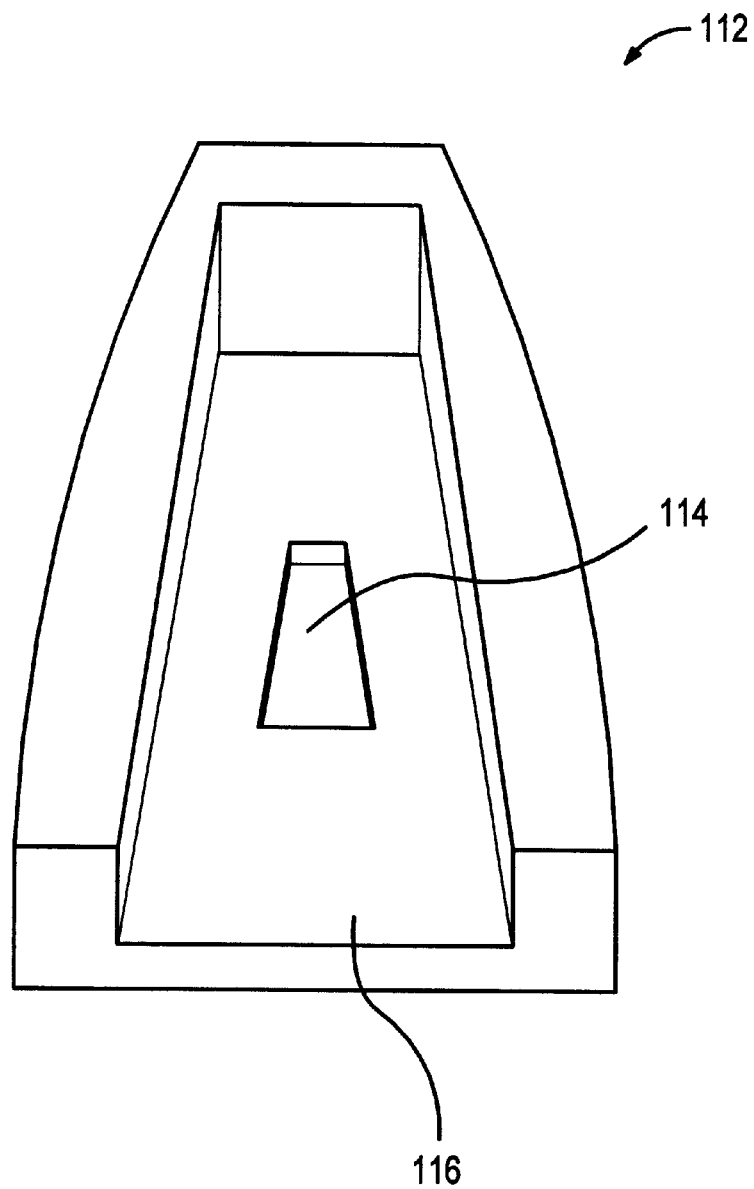
FIG. 16 is a perspective view of a mechanical adapter in accordance with an alternative embodiment of the invention.
Figure 17:
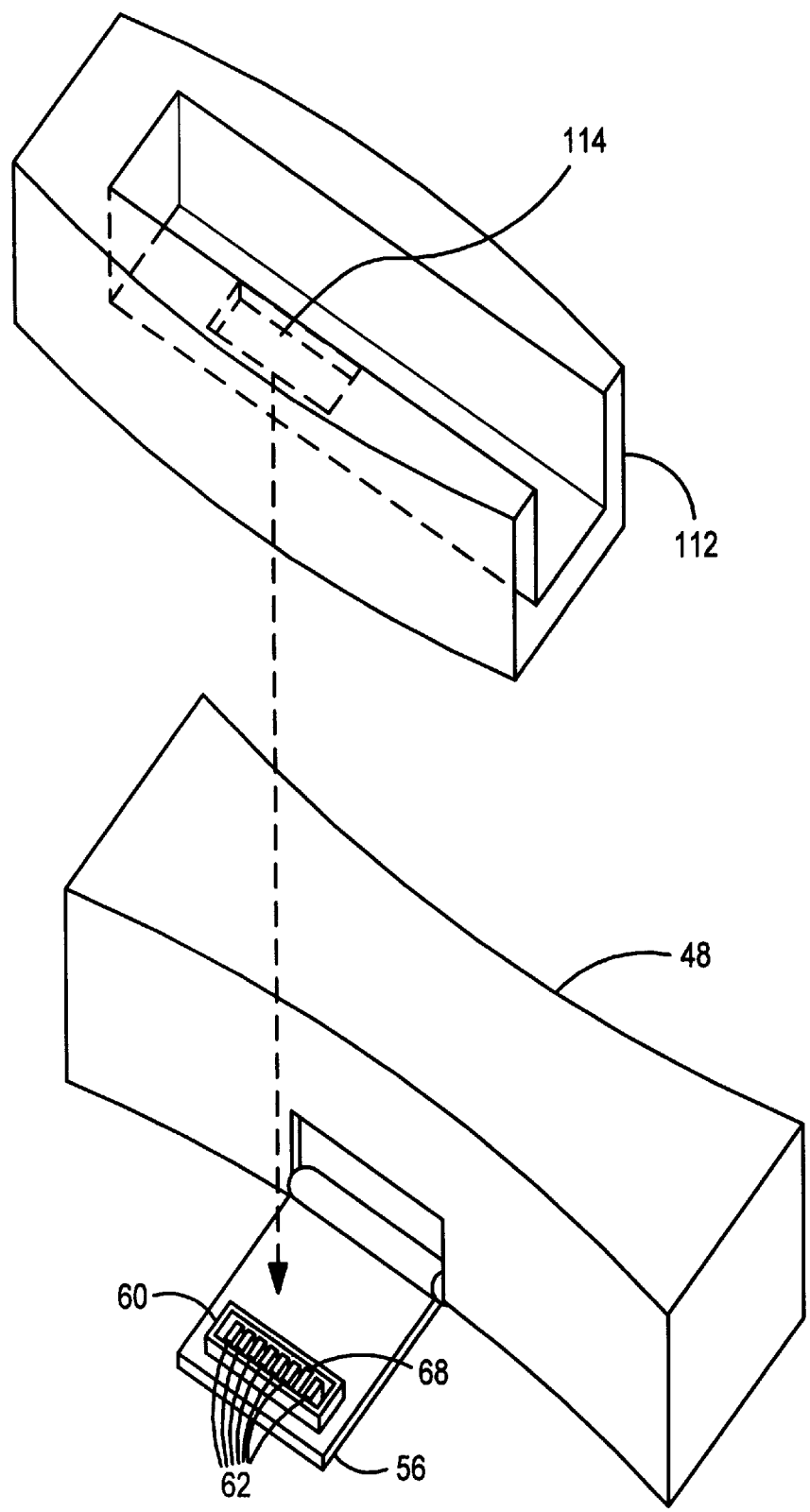
FIG. 17 is a perspective view of the mechanical adapter of FIG. 16 and the central module, illustrating the manner in which the mechanical adapter is attached to the central module.
Figure 18:
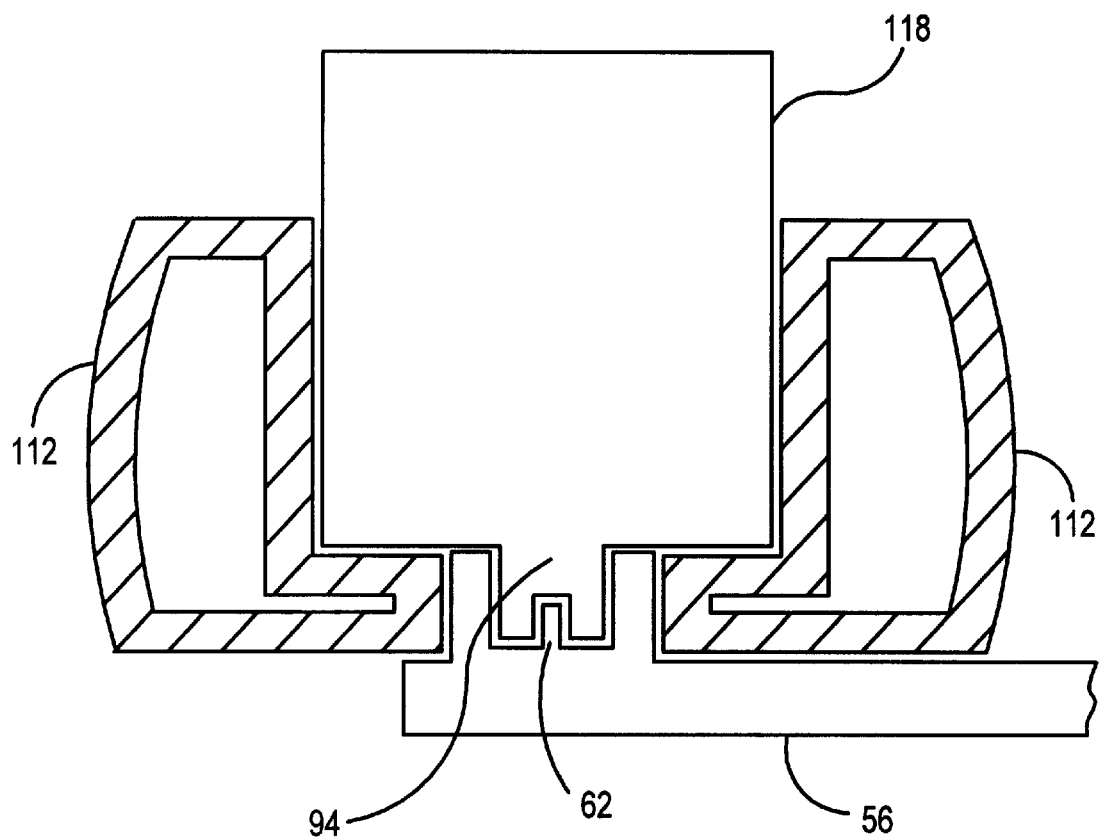
FIG. 18 is a cross-sectional view of the mechanical adapter of FIG. 16 attached to a fold-out connector of the central module, illustrating the manner in which a battery is electrically connected to the central module.

Turning now to FIG. 16, a mechanical adapter 112 in accordance with an alternative embodiment is shown. The mechanical adapter 112 does not have any electrical contacts, such as the electrical contacts 66 and the battery contacts 90 of the mechanical adapters 80 and 100. The mechanical adapter 112 has a hole 114 within its battery compartment 116. The hole allows the mechanical adapter to be physically attached to a fold-out connector 56 or 58 of the central module 48, as illustrated in FIGS. 17 and 18. When attached, the electrical contacts 62 of the fold-out connector 56 or 58 are exposed within the battery compartment 116 of the attached mechanical adapter 112. The exposed electrical contacts of the fold-out connector allow a notebook battery 118 to be electrically coupled to the central module by directly mating with the exposed electrical contacts, as illustrated by the cross-sectional view of the attached mechanical adapter 112 in FIG. 18. Thus, in this alternative embodiment, the mechanical adapter is merely a "shell" that holds the notebook battery 118 in place, so that it can receive the charging current from the central module 48 of the battery charger 20.

What is claimed is:

1. A battery charger comprising:
a module containing circuitry to provide charging current from an input electrical power, said module including first and second electrical connectors configured to connect directly to first and second batteries that are to receive said charging current;
a first detachable battery holder that accommodates said first battery, said first detachable battery holder having a first means for providing physical coupling to said module, said first detachable battery holder being configured such that said first battery is physically and electrically connected to said first electrical connector when said first detachable battery holder is attached to said module; and a second detachable battery holder that accommodates said second battery, said second detachable battery holder having a second means for providing physical coupling to said module, said second detachable battery holder being configured such that said second battery is physically and electrically connected to said second electrical connector when said second detachable battery holder is attached to said module.

2. The battery charger of claim 1 wherein said module includes first and second connectors, said first connector providing an electrical connection between said first battery and said module when said first detachable battery holder is attached to said module and said first battery is placed in said first detachable battery holder, said second connector providing an electrical connection between said second battery and said module when said second detachable battery holder is attached to said module and said second battery is placed in said second detachable battery holder.

3. The battery charger of claim 1 wherein said first and second connectors of said module are attached to said module such that said first and second connectors can be lowered and raised in a drawbridge-like manner.

4. The battery charger of claim 1 further comprising an AC/DC adapter to convert alternating current into direct current, said direct current being said input electrical power.

5. The battery charger of claim 4 wherein said AC/DC adapter is included in said module such that said AC/DC adapter is integrated into said module.

6. The battery charger of claim 4 further comprising an electrical cord connected to said AC/DC adapter, said electrical cord having an electrical connector that is designed to be coupled to a notebook computer to transfer said direct current from said AC/DC adapter to said notebook computer.

7. The battery charger of claim 1 wherein said first detachable battery holder includes a battery compartment, said battery compartment having a first region defined by a first pair of side walls of said battery compartment and a second region defined by a second pair of side walls of said battery compartment, said side walls of said first pair being separated by a smaller distance than said side walls of said second pair, said first region of said battery compartment being of size to accommodate a first-sized battery, said second region of said battery compartment being of size to accommodate a second-sized battery.

8. The battery charger of claim 1 wherein said first detachable battery holder and said second detachable battery holder are structurally configured to accommodate notebook batteries.

9. A battery charger comprising:
a module containing circuitry to convert an input electrical power to a charging current, said module having first and second connectors to distribute said charging current, said first and second connectors of said module being attached to said module such that said first and second connectors can be lowered and raised in a drawbridge-like manner;

a first detachable battery holder accommodates a first battery, said first detachable battery holder having a first corresponding connector that is electrically coupled to said first connector of said module to receive said charging current for recharging said first battery when said first detachable battery holder is affixed to said module; and a second detachable battery holder accommodates a second battery, said second detachable battery holder having a second corresponding connector that is electrically coupled to said second connector of said module to receive said charging current for recharging said second battery when said second detachable battery holder is affixed to said module.

10. The battery charger of claim 9 wherein said first detachable battery holder and said second detachable battery holder include a battery compartment, said battery compartment having dimensions to accommodate notebook batteries.

11. The battery charger of claim 9 further comprising an AC/DC adapter to convert alternating current into direct current, said direct current being said input electrical power.

12. The battery charger of claim 11 further comprising an electrical cord connected to said AC/DC adapter, said electrical cord having an electrical connector that is designed to be coupled to a notebook computer to transfer said direct current from said AC/DC adapter to said notebook computer.

13. The battery charger of claim 9 wherein said first detachable battery holder includes a battery compartment, said battery compartment having a first region defined by a first pair of side walls of said battery compartment and a second region defined by a second pair of side walls of said battery compartment, said side walls of said first pair being separated by a smaller distance than said side walls of said second pair, said first region of said battery compartment being of size to accommodate a first-sized battery, said second region of said battery compartment being of size to accommodate a second-sized battery.

14. A power supply device for a portable computer that can recharge at least one notebook battery comprising:
an AC/DC adapter that can convert an input AC to an output DC, said output DC providing an operating power to a connected notebook computer;

a battery charging module that converts said output DC to a charging current, said battery charging module having connector means for providing connectors to said charging current;

a first detachable battery holder configured to hold a first battery that is physically attached to said battery charging module, said first detachable battery holder being physically connected to said battery charging module when said first battery is electrically attached directly to said connector means of said battery charging module to receive said charging current for recharging said first battery; and a second detachable battery holder configured to hold a second battery that is physically attached to said battery charging module, said second detachable battery holder being physically connected to said battery charging module when said second battery is electrically attached directly to said connector means of said battery charging module to receive said charging current for recharging said second battery.

15. The battery charger of claim 14 wherein said battery charging module includes first and second connectors, said first connector being configured to be coupled to said first detachable battery holder such that said first detachable battery holder is physically connected to said battery charging module when said first connector is coupled to said first detachable battery holder, said second connector being configured to be coupled to said second detachable battery holder such that said second detachable battery holder is physically connected to said battery charging module when said second connector is coupled to said second detachable battery holder.

16. The battery charger of claim 15 wherein said first and second connectors of said battery charging module are attached to said battery charging module such that said first and second connectors can be lowered and raised in a drawbridge-like manner.

17. The battery charger of claim 14 wherein said AC/DC adapter is contained within said battery charging module.

18. The battery charger of claim 14 wherein said first detachable battery holder includes a battery compartment, said battery compartment having a first region defined by a first pair of side walls of said battery compartment and a second region defined by a second pair of side walls of said battery compartment, said side walls of said first pair being separated by a smaller distance than said side walls of said second pair, said first region of said battery compartment being of size to accommodate a first-sized battery, said second region of said battery compartment being of size to accommodate a second-sized battery.

* * * * *